United States Patent [19]
Takaku et al.

[11] Patent Number: 4,735,983
[45] Date of Patent: Apr. 5, 1988

[54] FLAME-RETARDANT STYRENE-BASE RESIN COMPOSITION

[75] Inventors: Masato Takaku, Yokohama; Ichiro Otsuka, Tokyo; Keizi Iio, Yokosuka; Nobuyuki Tashiro, Yokohama; Daizo Natsugari, Yokosuka; Hideo Ichikawa, Chigasaki, all of Japan

[73] Assignee: Mitsui Toatsu Chemicals, Inc., Tokyo, Japan

[21] Appl. No.: 31,155

[22] Filed: Mar. 25, 1987

Related U.S. Application Data

[63] Continuation of Ser. No. 822,759, Jan. 27, 1986, abandoned.

[30] Foreign Application Priority Data

Feb. 5, 1985 [JP] Japan .................. 60-19366

[51] Int. Cl.$^4$ .............. C08K 5/13; C08K 5/06
[52] U.S. Cl. .................. 524/281; 524/341; 524/369; 524/411; 524/412
[58] Field of Search .............. 524/281, 411, 412, 369, 524/341

[56] References Cited

U.S. PATENT DOCUMENTS

| | | | |
|---|---|---|---|
| 3,075,944 | 1/1963 | Wick et al. | 524/371 |
| 3,250,739 | 5/1966 | Sauer et al. | 524/369 |
| 3,372,141 | 3/1968 | Dickerson et al. | 524/384 |
| 3,639,302 | 2/1972 | Brown et al. | 521/88 |
| 3,741,893 | 6/1973 | Mascioli et al. | 524/410 |
| 3,830,766 | 8/1974 | Praetzel et al. | 524/369 |
| 3,842,033 | 10/1974 | Brady et al. | 524/412 |
| 3,846,469 | 11/1974 | Gunsher et al. | 524/281 |
| 3,993,621 | 11/1976 | McInerney et al. | 524/412 |
| 4,089,912 | 5/1978 | Levek et al. | 524/412 |
| 4,567,218 | 1/1986 | Petiet | 524/412 |

FOREIGN PATENT DOCUMENTS 2226694 12/1972 Fed. Rep. of Germany .

OTHER PUBLICATIONS

Tabor, Theodore et al–Fire Retardants: "Proceedings of 1974 Intnl. Symposium on Flammability and Fire Retardants"–May 1–2, 1974, Ontario, Canada, Technomic Pub. Co. Westport Conn., pp. 162–178, published 1979, Vijay Mohan Bhatnagar editor.

Primary Examiner—Veronica P. Hoke
Attorney, Agent, or Firm—Oblon, Fisher, Spivak, McClelland & Maier

[57] ABSTRACT

A flame-retardant styrene-base resin composition is composed of 100 parts by weight of a styrene-base resin, 2.0–20.0 parts by weight of a halogenous flame retardant and 0.1–5.0 parts by weight of an antimony compound. The weight ratio of halogen atoms/antimony atoms in the resin composition is 5 or greater. The resin composition of this invention has well-balanced specific gravity, impact resistance and heat resistance and flame retardancy.

5 Claims, No Drawings

FLAME-RETARDANT STYRENE-BASE RESIN COMPOSITION

This application is a continuation of application Ser. No. 822,759 filed on Jan. 27, 1986, now abandoned.

BACKGROUND OF THE INVENTION

(1) Field of the Invention

This invention relates to a flame-retardant styrene-base resin composition having well-balanced specific gravity, impact resistance and heat resistance and flame retardancy. Specifically, it relates to an improved flame-retardant styrene-base resin composition which contains both halogenous flame retardant and antimony compound and can successfully meet the requirements prescribed in the UL Standard, 94V-2.

(2) Description of the Prior Art

Styrene-base resins have already been used for various applications such as household electric appliances and office automation equipment owing to their superb moldability and processability, mechanical properties, electrical properties and the like. Reflecting the increasing enactment of various regulations for flame retardation in recent years typified by the UL Standard, flame-retarded styrene-base resins have also been developed and brought into use. Among such flame-retarded styrene-base resins, flame-retardant styrene-base resin compositions which meet the requirements of the UL Standard, 94V-2 are used in video tape recorders, audio systems and the like, all of which enjoy outstanding growth rates recently, and their consumption is hence increasing rapidly. Accordingly, there is an outstanding demand for the development of a flame-retardant styrene-base resin composition which has well-balanced specific gravity, impact resistance and heat resistance and flame retardancy.

As a method for imparting flame retardancy to a styrene-base resin, it has conventionally been known to make combined use of a flame retardant such as halogen compound or phosphorus compound and a flame-retarding additive such as antimony compound. Where flame retardancy is imparted especially by using a halogen compound and an antimony compound, their synergistic effects are believed to reach the maximum when the weight ratio of halogen atoms/antimony atoms is 3. Flame retardancy, which meets the requirements of the UL Standard, 94V-2, is believed to be imparted in a similar manner. This method has thus been used widely.

In a resin which contains halogen atoms and antimony atoms at a weight ratio of 3 and meets the requirements of the UL Standard, 94V-2, the flame retardancy of the resin is ensured. In order to achieve such flame retardancy, it is however indispensable to increase the total amount of the halogen compound and antimony compound relative to the resin. As a result, the resin has a high specific gravity and inferior impact resistance and heat resistance. Its specific gravity and above-mentioned properties are therefore not satisfactorily balanced with its flame retardancy. The resin is by no means satisfactory as a molding material.

SUMMARY OF THE INVENTION

An object of this invention is to solve the above-described problems of the prior art flame-retardant styrene-base resin compositions and hence to provide a flame-retardant styrene-base resin composition which can meet the aforementioned demand, can fulfill the requirements of the UL Standard, 94V-2 and can thus be widely used in household electric appliances such as video tape recorders and audio systems and office automation equipment.

With the foregoing in view, the present inventors have carried out an extensive research. As a result, the following surprising facts have been found. Namely, a styrene-base resin can be imparted with better flame retardancy by controlling the weight ratio of halogen atoms/antimony atoms to 5 or higher, preferably 6 or higher or more preferably 7 or higher in the resultant resin composition rather than controlling it to 3 which has been believed to bring about the greatest flame retardancy. It is thus still possible to meet the requirements of the UL Standard, 94V-2 even when the total amount of the incorporated halogenous flame retardant and antimony compound is reduced in the resultant resin composition. This reduced total amount of the halogenous flame retardant and antimony compound can improve the balance between the specific gravity, impact resistance and heat resistance of the resultant resin composition and its flame retardancy. The above findings have led to the present invention.

The present invention therefore provides a flame-retardant styrene-base resin composition comprising 100 parts by weight of a styrene-base resin, 2.0–20.0 parts by weight of a halogenous flame retardant and 0.1–5.0 parts by weight of an antimony compound, wherein the weight ratio of halogen atoms/antimony atoms in the resin composition is 5 or greater, preferably 6–20, or most preferably 7–15.

The resin composition of this invention has improved the reduction to the inherent impact resistance and heat resistance of the base resin and the increase to the specific gravity of the base resin, which have been serious drawbacks of conventional flame-retardant styrene-base resins, and has a high commercial value as a flame-retardant styrene-base resin composition which is excellently balanced in specific gravity, impact resistance and heat resistance and flame retardancy and is in particularly high demand in recent years.

The above and other objects, features and advantages of the present invention will become apparent from the following description and the appended claims.

DETAILED DESCRIPTION OF THE INVENTION AND PREFERRED EMBODIMENTS

As described above, it is essential to control the weight ratio of halogen atoms/antimony atoms above 5 in the resin composition of this invention. If the weight ratio of halogen atoms/antimony atoms is smaller than 5 in the resin composition, inferior flame retardancy will be imparted even when the halogenous flame retardant is used in the same amount. In order to meet the requirements of the UL Standard, 94V-2, it is therefore necessary to increase the total amount of the halogenous flame retardant and antimony compound relative to the resultant resin composition compared with their total amount in the resin composition of this invention. As a result, the resulting resin composition will be high in specific gravity and inferior in impact resistance and heat resistance, its specific gravity, impact resistance and heat resistance are poorly balanced with its flame retardancy, and it is therefore unsatisfactory as a molding material.

As exemplary styrene-base resins useful in the practice of the present invention, may be mentioned (i) homopolymer and copolymers of styrene-type monomers including styrene monomer and styrene derivatives, e.g., α-substituted styrenes such as α-methylstyrene and nucleus-substituted styrenes such as p-tert-butylstyrene, p-methylstyrene, vinyltoluene and chlorostyrene, (ii) copolymers, each, of one or more monomers of the above-described styrene-type monomers and another monomer, for example, styrene-acrylonitrile copolymer (AS resin),(iii) graft polymers, each, obtained by graft-polymerizing one or more monomers of the above-described styrene-type monomers, optionally, together with another monomer to a butadiene-base rubber, for example, styrene graft polymer, styrene-acrylonitrile graft polymer (ABS resin), (iv) polyblends of these styrene-base resins (i), (ii) or (iii) and butadiene-base rubbers, etc. When the styrene-base resin is any one of the above-described resins (i), (ii) and (iii), the above-described styrene-type monomer or monomers are supposed to amount to at least 50 wt. % or preferably at least 70 wt. % of all monomers employed to obtain the resin.

Illustrative of the halogenous flame retardant useful in the practice of this invention may include tetrabromobisphenol A represented by the following formula:

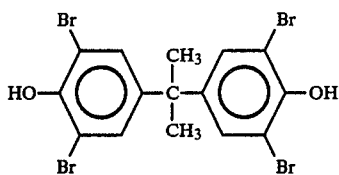

tetrabromobisphenol A carbonate oligomers represented by the following structural formula:

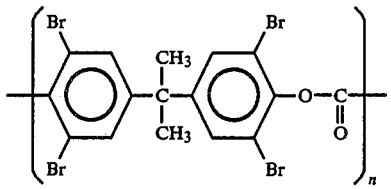

wherein n stands for 2-10, ether derivatives of tetrabromobisphenol A represented by the following formula:

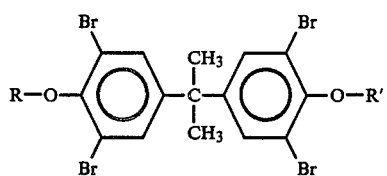

wherein R and R' independently mean a $C_{1-3}$ alkyl group which may be substituted by one or more halogen atoms, allyl group or 2-hydroxyethyl group, decabromodiphenyl oxide, hexabromobenzene, 1,1,2,2-tetrabromoethane, 1,2,5,6,9,10-hexabromocyclododecane, perchlorocyclopentadecane, tris(2,3-dibromopropyl) phosphate, and the like. They may be used in combination. Among the above-exemplified halogenous flame retardants, the tetrabromobisphenol A, tetrabromobisphenol A carbonate oligomers and the ether derivatives of tetrabromobisphenol A are particularly preferred.

As exemplary antimony compounds useful in the practice of this invention, may be mentioned antimony trioxide ($Sb_2O_3$), antimony tetroxide ($Sb_2O_4$), antimony pentoxide ($Sb_2O_5$) and the like with antimony trioxide being particularly preferred.

No specific limitation is imposed on the manner of mixing the flame-retardant styrene-base resin composition of this invention. It may for example be premixed in a drum tumbler, Henschel mixer or the like, followed by melt extrusion through a Banbury mixer, rolls or the like. Alternatively, masterbatching may be followed. Namely, a resin composition having the formulation of the composition of this invention may be obtained by diluting a mixture of a flame retardant and an antimony compound with a styrene-base resin.

The resin composition of this invention may be added, if necessary or desirable, with various additives routinely employed in thermoplastic resins, for example, ultraviolet absorbent, colorant, antioxidant, lubricant, plasticizer, stabilizer, antistatic agent, etc.

A flame-retardant styrene-base resin is generally increased in specific gravity and reduced in impact resistance and heat resistance upon incorporation of a flame retardant and an antimony compound.

When imparting the same degree of flame retardancy, the present invention makes it possible to lower the total amount of the added halogenous flame retardant and antimony compound relative to the resulting resin composition compared with conventional resin compositions which also meet the requirements of the UL Standard, 94V-2. As a result, it is possible to minimize the increase to the specific gravity of the resin while maintaining the inherent excellent impact resistance and heat resistance of the same resin. In other words, the present invention can provide a flame-retardant styrene-base resin composition having excellently-balanced specific gravity, impact resistance and heat resistance and flame retardancy, which have not been feasible to achieve by any conventional flame-retardant styrene-base resin compositions.

The present invention will hereinafter be described in further detail by the following Example and Comparative Examples. It should however be borne in mind that the present invention is not limited to or by the following Examples.

EXAMPLES 1-2 & COMPARATIVE EXAMPLES 1-4:

To 100 parts by weight of high-impact polystyrene ("Toporex 855-51", trade name for a graft polymer obtained by graft-polymerizing a butadiene-base rubber with styrene monomer in an amount of 92 wt. % based on the resin; product of Mitsui-Toatsu Chemicals, Inc.; will hereinafter be abbreviated as "HIPS"), one of the halogenous flame retardants and antimony trioxide were mixed in their corresponding proportions given in Table 1. By using an extruder whose barrel diameter was 40 mm, the resultant composition was pelletized at an extrusion temperature of 200° C.

Thereafter, the pellets were injection-molded at a molding temperature of 220° C. to prepare test pieces. The burning test of the test pieces and the measurement of their impact resistance, heat resistance and specific gravities were conducted in accordance with the following methods.

Burning test: The UL Standard, 94. Vertical Test.

Impact resistance: Izod Impact Test, JIS K-6871.
Heat resistance: Vicat Softening Point, JIS K-6871.

pared and their evaluation was effected. Results are shown in Table 1.

TABLE 1

| | | Example 1 | Comp. Ex. 1 | Comp. Ex. 2 |
|---|---|---|---|---|
| Base resin | HIPS | 100 | 100 | 100 |
| Halogenous flame retardant | Ether derivative* of TBA (tetrabromobisphenol A) | 5.0 | 7.0 | 5.0 |
| Antimony trioxide | | 0.5 | 1.9 | 1.3 |
| Weight ratio of halogen atoms/antimony atoms | | 8.0 | 3.0 | 3.0 |
| Burning test | Time in seconds until self-extinguishment (1st test) | 5 | 10 | 20 |
| | Time in seconds until self-extinguishment (2nd test) | 3 | 7 | 40 |
| | Melt dripping | Dripped | Dripped | Dripped |
| | UL 94 rating | V-2 | V-2 | HB |
| Impact resistance, Izod impact strength (kg · cm/cm) | | 9.0 | 7.7 | 8.5 |
| Heat resistance, Vicat softening point (°C.) | | 100 | 98 | 100 |
| Specific gravity | | 1.070 | 1.095 | 1.078 |

| | | Example 2 | Comp. Ex. 3 | Comp. Ex. 4 |
|---|---|---|---|---|
| Base resin | HIPS | 100 | 100 | 100 |
| Halogenous flame retardant | TBA** (tetrabromobisphenol A) | 7.0 | 8.0 | 7.0 |
| Antimony trioxide | | 0.5 | 1.9 | 1.6 |
| Weight ratio of halogen atoms/antimony atoms | | 11.1 | 3.0 | 3.0 |
| Burning test | Time in seconds until self-extinguishment (1st test) | 15 | 25 | 45 |
| | Time in seconds until self-extinguishment (2nd test) | 8 | 10 | 20 |
| | Melt dripping | Dripped | Dripped | Dripped |
| | UL 94 rating | V-2 | V-2 | HB |
| Impact resistance, Izod impact strength (kg · cm/cm) | | 8.3 | 6.5 | 7.3 |
| Heat resistance, Vicat softening point (°C.) | | 95 | 94 | 95 |
| Specific gravity | | 1.080 | 1.100 | 1.090 |

| | | Example 3 | Comp. Ex. 5 | Comp. Ex. 6 |
|---|---|---|---|---|
| Base resin | ABS | 100 | 100 | 100 |
| Halogenous flame retardant | Ether derivative* of TBA (tetrabromobisphenol A) | 6.0 | 7.0 | 6.0 |
| Antimony trioxide | | 0.5 | 1.9 | 1.6 |
| Weight ratio of halogen atoms/antimony atoms | | 9.6 | 3.0 | 3.0 |
| Burning test | Time in seconds until self-extinguishment (1st test) | 10 | 12 | 15 |
| | Time in seconds until self-extinguishment (2nd test) | 8 | 10 | 40 |
| | Melt dripping | Dripped | Dripped | Dripped |
| | UL 94 rating | V-2 | V-2 | HB |
| Impact resistance, Izod impact strength (kg · cm/cm) | | 12.5 | 11.0 | 11.5 |
| Heat resistance, Vicat softening point (°C.) | | 107 | 106 | 107 |
| Specific gravity | | 1.075 | 1.095 | 1.085 |

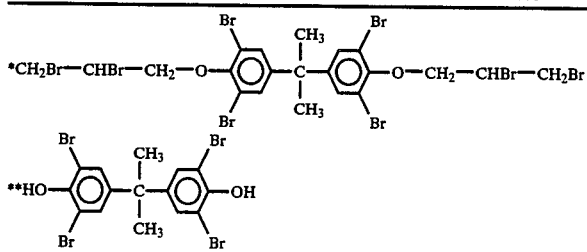

Specific gravity: JIS K-6871.
Results are shown in Table 1.

EXAMPLE 3 & COMPARATIVE EXAMPLES 5-6:

To 100 parts by weight of ABS resin ("Santac ST-30", trade name for a graft polymer obtained by graft-polymerizing a butadiene-base rubber with styrene monomer and acrylonitrile in an amount of 64.6 and 20.4 wt. %, respectively, based on the resin; product of Mitsui-Toatsu Chemicals, Inc.; will hereinafter be abbreviated as "ABS"), the halogenous flame retardant and antimony trioxide were mixed in their corresponding proportions given in Table 1. Then, in the same manner as in Examples 1 and 2, test pieces were prepared and their evaluation was effected. Results are shown in Table 1.

Compared with the test pieces of Examples 1, 2 and 3 all of which fell within the scope of the present invention, the test pieces of Comparative Examples 1, 3 and 5 which fell outside the scope of the present invention had poorer impact resistance and heat resistance and greater specific gravities although the latter test pieces also met the requirements of the UL Standard, 94V-2. In the case of the test pieces of Comparative Examples 2, 4 and 6, their heat resistance was equivalent and their impact resistance and specific gravities were not different too much. However, they did not meet the requirements of the UL Standard, 94V-2. It has thus been confirmed that the balance between the specific gravity, impact resistance and heat resistance and the flame retardancy is very poor outside the scope of this invention.

Having now fully described the invention, it will be apparent to one of ordinary skill in the art that many changes and modifications can be made thereto without departing from the spirit or scope of the invention as set forth herein.

What is claimed is:

1. A flame-retardant styrene-based resin composition, comprising:
   (a) 100 parts by weight of a styrene-based resin,
   (b) from 2.0 to 20.0 parts by weight of a flame-retardant selected from the group consisting of tetrabromobisphenol A, a tetrabromobisphenol A carbonate oligomer and an ether derivative of tetrabromobisphenol A, and
   (c) from 0.1 to about 0.5 part by weight of antimony trioxide, the weight ratio of bromine atoms/antimony atoms in the resin composition ranging from 6 to 20.

2. The flame-retardant styrene-based resin composition of claim 1, wherein the weight ratio of halogen atom/antimony atoms ranges from 7 to 15.

3. The flame-retardant styrene-based resin composition of claim 1, wherein said styrene-based resin is a homopolymer or copolymer of styrene, α-methylstyrene, p-t-butylstyrene, p-methylstyrene, vinyltoluene or chlorostyrene.

4. The flame-retardant sytrene-based resin composition of claim 1, wherein said styrene-based resin is a copolymer of acrylonitrile and a styrene monomer selected from the group consisting of sytrene, α-methylstyrene, p-t-butylstyrene, p-methylstyrene, vinyltoluene and chlorostyrene.

5. The flame-retardant styrene-based resin composition of claim 1, wherein said styrene-based resin is a graft polymer obtained by graft polymerizing at least one styrene monomer, optionally with another monomer, to a butadiene-based rubber.

* * * * *